United States Patent [19]

Volpe et al.

[11] Patent Number: 5,785,394
[45] Date of Patent: Jul. 28, 1998

[54] SOLENOID ASSEMBLY FOR ANTI-LOCK BRAKING SYSTEM

[75] Inventors: Frank W. Volpe, Novi; Anthony M. Strano, Canton, both of Mich.

[73] Assignee: Ford Global Technologies, Inc., Dearborn, Mich.

[21] Appl. No.: 653,536

[22] Filed: May 24, 1996

[51] Int. Cl.⁶ .................. B60T 13/66; B60T 8/32
[52] U.S. Cl. .................. 303/119.2; 303/113.1
[58] Field of Search .................. 303/113.1, 113.2, 303/119.1, 119.2; 137/596.17; 251/129.15; 335/260, 278, 299

[56] References Cited

U.S. PATENT DOCUMENTS

| | | |
|---|---|---|
| 4,236,131 | 11/1980 | Grandclement .................. 335/260 |
| 4,272,747 | 6/1981 | Bauer . |
| 4,515,345 | 5/1985 | Inden et al. .................. 335/260 |
| 4,679,767 | 7/1987 | Vollmer et al. . |
| 4,683,454 | 7/1987 | Vollmer et al. . |
| 4,882,558 | 11/1989 | Takayanagi .................. 335/260 |
| 4,949,752 | 8/1990 | Nogle et al. . |
| 5,138,292 | 8/1992 | Forster .................. 335/260 |
| 5,226,221 | 7/1993 | Kilgore . |
| 5,331,730 | 7/1994 | Brinn, Jr. . |
| 5,423,117 | 6/1995 | Okada et al. . |
| 5,449,227 | 9/1995 | Steinberg et al. . |
| 5,452,948 | 9/1995 | Cooper et al. . |
| 5,513,905 | 5/1996 | Zeides et al. .................. 303/119.2 |
| 5,588,202 | 12/1996 | Ehlers et al. .................. 29/841 |

*Primary Examiner*—Robert J. Oberleitner
*Assistant Examiner*—Chris Schwartz
*Attorney, Agent, or Firm*—Joseph W. Malleck, Esq.; Roger L. May, Esq.

[57] ABSTRACT

A solenoid assembly for an anti-lock braking system includes a housing having a cavity, a plurality of solenoids, each of said solenoids being received within the cavity, and an overmold disposed between the housing and each of the solenoids to provide a resilient force for each of the solenoids.

17 Claims, 3 Drawing Sheets

5,785,394

1

SOLENOID ASSEMBLY FOR ANTI-LOCK BRAKING SYSTEM

BACKGROUND OF THE INVENTION

1. Field of the Invention

The present invention relates generally to solenoid assemblies and, more specifically, to a solenoid assembly for an anti-lock braking system.

2. Description of the Related Art

It is known to provide a solenoid assembly for an anti-lock braking system on a motor vehicle. Typically, the solenoid assembly includes a housing, solenoids and leads electrically connecting the solenoids to a circuit board of an electronic control unit. Each solenoid includes coil windings and a bobbin contained within a can. The solenoid assembly includes a retention ring, including retention snaps, associated with each solenoid for removably retaining each solenoid in the housing. Each solenoid is further mounted to an elastomeric gasket that both seals about an adjustment gap, open to the circuit board, and biases the solenoid against its corresponding valve of a hydraulic control unit.

Although the above solenoid assembly has worked well, it suffers from the disadvantage that pullout stress on the leads exist during disassembly of the electronic control unit from the hydraulic control unit. Another disadvantage of the solenoid assembly is that the solenoids may be displaced after disassembly. Yet another disadvantage of the solenoid assembly is that an extra spring rubber component is used which results in increased material cost. Still another disadvantage of the solenoid assembly is that the solenoids are overmolded in polyamide which is undesired. A further disadvantage of the solenoid assembly is that it is relatively time intensive to assemble.

SUMMARY OF THE INVENTION

Accordingly, the present invention is a solenoid assembly for an anti-lock braking system including a housing having a cavity and a plurality of solenoids, each of the solenoids being received within the cavity. The solenoid assembly also includes an overmold disposed between the housing and each of the solenoids to provide a resilient force for each of the solenoids.

One feature of the present invention is that a new and improved solenoid assembly is provided for an anti-lock braking system. Another feature of the present invention is that a snap and barb in the bobbin and housing retain the solenoid in position during disassembly of the electronic control unit from the hydraulic control unit, eliminating pullout stress on the leads. Yet another feature of the present invention is that a relatively soft overmold material is used as a binder to hold the can and wire/bobbin of the solenoid together and to provide passivation to the solenoid and to act as a spring to hold the solenoid in position and eliminate the extra spring rubber component. Still another feature of the present invention is that fingers in the housing maintain true solenoid position to facilitate assembly of the electronic control unit to the hydraulic control unit and provide tension in the solenoid to prevent wobble during shipping and handling. A further feature of the present invention is that a solid bronze pin lead extends from the solenoids which is compliant in the x,y and z directions yet is strong enough to facilitate assembly. A still further feature of the present invention is that the solenoid assembly requires less process steps for assembly, resulting in less labor, facilities and tooling investment.

2

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
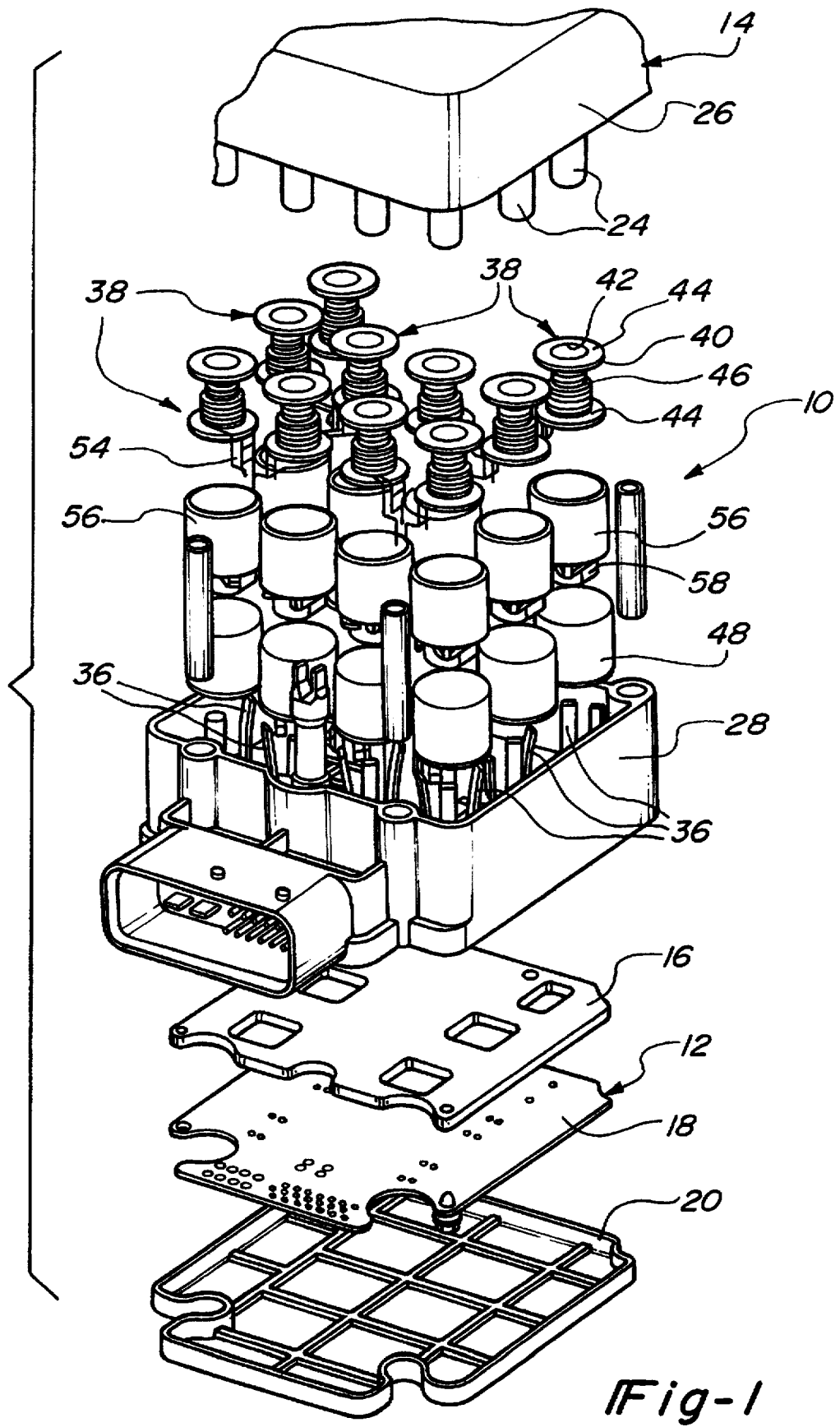
FIG. 1 is an exploded perspective view of a solenoid assembly, according to the present invention, illustrated in operational relationship with an electronic control unit and hydraulic control unit.
Figure 2:
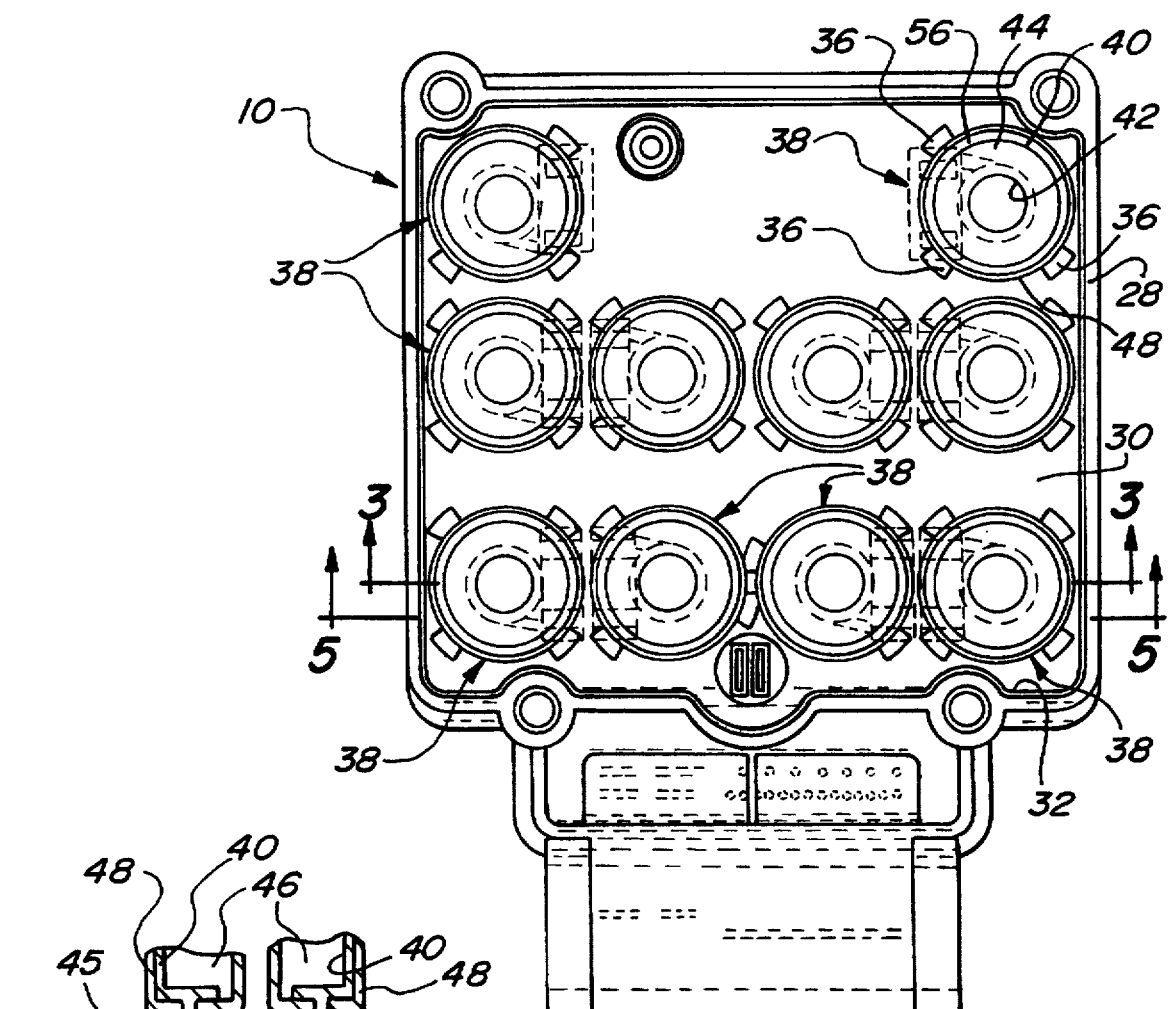
FIG. 2 is a plan view of the solenoid assembly and electric control unit of FIG. 1.
Figure 4:
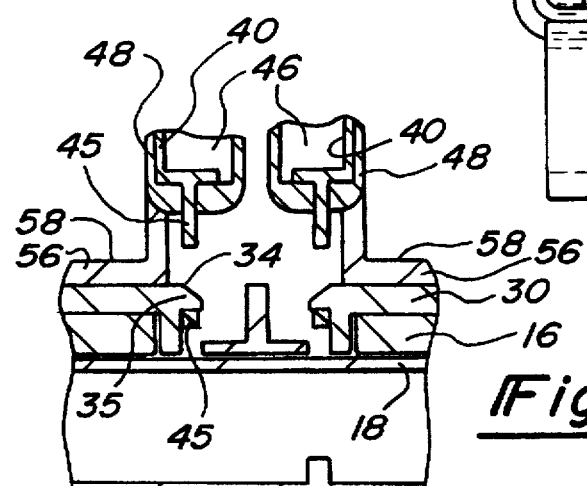
FIG. 4 is an enlarged view of circle 4 of FIG. 3.
Figure 3:
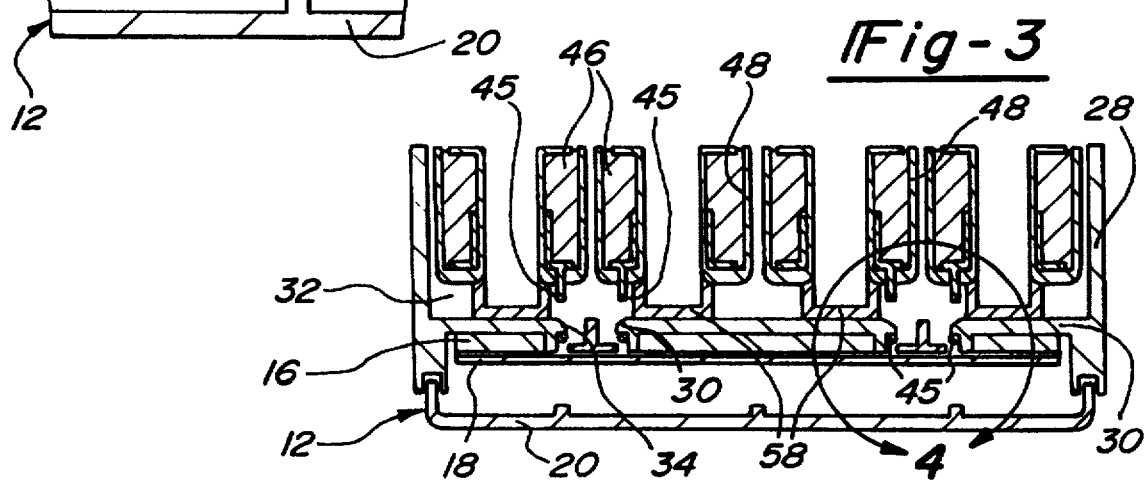
FIG. 3 is a sectional view taken along line 3—3 of FIG. 2.
Figure 5:
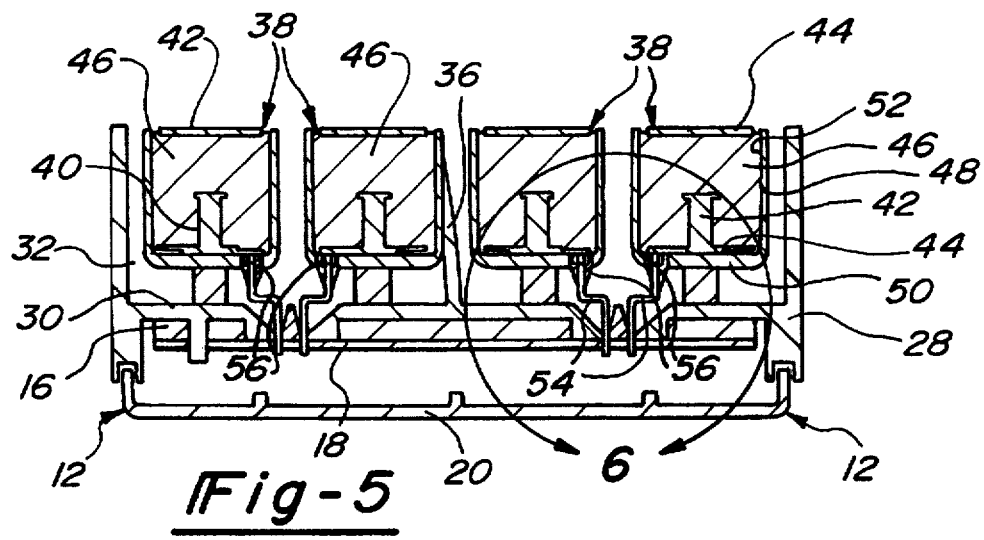
FIG. 5 is a sectional view taken along line 5—5 of FIG. 2.
Figure 6:
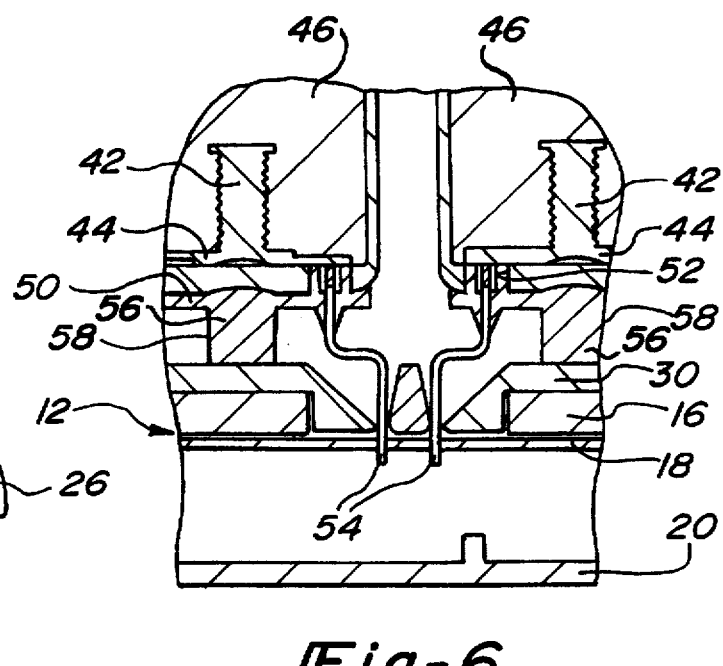
FIG. 6 is an enlarged view of circle 6 of FIG. 5.

Referring to the drawings and in particular to FIGS. 1 and 2, one embodiment of a solenoid assembly 10, according to the present invention, is illustrated in operational relationship with an electronic control unit, generally indicated at 12 and a hydraulic control unit, generally indicated at 14. The electronic control unit 12 includes a heat plate 16, printed wiring or circuit board 18 and a cover 20. The hydraulic control unit 14 includes a plurality of valves having valve seats 22 and valve stems 24, one for each valve, retained in a valve block 26. It should be appreciated that the solenoid assembly 10 is sandwiched between the hydraulic control unit 14 and electronic control unit 12 and secured together by suitable means such as fasteners (not shown) It should also be appreciated that the hydraulic control unit 14 and electronic control unit 12 are conventional and known in the art.

Referring to FIGS. 1 through 6, the solenoid assembly 10 includes a housing 28 having a generally rectangular shape and a base wall 30 extending generally planar and perpendicular thereto forming a cavity 32. The base wall 30 has a plurality of apertures 34 extending therethrough and a barb 35 extending into each of the apertures 34 for a function to be described. The base wall 30 has at least one, preferably a plurality of coil or solenoid retention fingers 36 extending upwardly from the base wall 30 and into the cavity 32 for a function to be described. It should be appreciated that the base wall 30, barbs 35 and fingers 36 are integral and formed as one-piece.

The solenoid assembly 10 also includes at least one, preferably a plurality of coils or solenoids, generally indicated at 38. Each solenoid 38 includes a bobbin 40 having a generally cylindrical shape. The bobbin 40 has a stem portion 42 extending axially and a flange portion 44 extending radially at each end of the stem portion 42. The stem portion 42 includes a passageway 43 extending axially therethrough. The bobbin 40 also includes a snap portion 45 extending axially to engage the barb 35 to latch the bobbin 40 to the housing 28 to hold the solenoid 38 in place. The bobbin 40 is made of a plastic material such as nylon or polyamide.

Each solenoid 38 also includes a coil or windings 46 wrapped around the stem portion 42 of the bobbin 40. The coil 46 is preferably made of a conductive wire such as copper. It should be appreciated that the coil 46 creates a magnetic field when it receives electrical current therethrough.

Each solenoid 38 includes a can 48 for receiving the bobbin 40. The can 48 has a generally cylindrical shape and a bottom wall 50 forming a cavity 52. The bottom wall 50 has at least one aperture 52 extending therethrough. The can 48 is made of a metal material.

Each solenoid 38 further includes at least one, preferably a plurality of leads or lead wires 54 that extend from the coil 46 and through the aperture 52 in the bottom wall 50 of the can 48. The leads 54 connect the coil 46 to the printed circuit board 18 to receive electrical current therefrom. Each lead 54 is made of a conductive material such as a bronze material. Each lead 54 is preferably direct soldered, using conventional methods on a wave solder machine (not shown), to the printed circuit board 18. It should be appreciated that other attachment methods such as soldering, resistance welding or direct plug-in are possible.

The solenoid assembly 10 further includes an overmold 56 to bend the coil 46, bobbin 40 can 48 and leads 54. The overmold 56 is made of a relatively low durometer (soft) material such as santoprene or silicone. The overmold 56 encapsulates the coil 46 to act as a coil magnet wire passivation and as a binder to hold the can 48 and coil/bobbin together. The overmold 56 extends through the aperture 52 of the can 48 and between the bottom wall 50 of the can 48 and base wall 30 of the housing 28 to act as a spring cap 58 to hold the coil 46 in position. It should be appreciated that the overmold 56 can be manufactured by pressure molding with conventional molding equipment. It should also be appreciated that the overmold 56 provides a spring stand off or spring cap 58 between the can 48 and the housing 28. It should further be appreciated that the overmold 56 passivates the magnetic wire of the coil 46.

To assemble the solenoid assembly 10, the overmold 56 is molded in place to hold the solenoid 38 together and to form the spring cap 58. The bobbin 40, coil 46 and can 48 are disposed between at least two fingers 36 and moved toward the base wall 30. The bobbin 40 is latched to the housing 28 by the snap and barb 45 and 35 respectively. The fingers 36 flex outwardly to allow the can 46 to be inserted therebetween and return inwardly to engage the can 46 for x and y direction retention. The snap and barb 45 and 35 between the bobbin 40 and housing 28 provides z direction retention. The soft bronze lead 54 connects the solenoid 38 directly to the printed circuit board 18. It should be appreciated that the injection molding process eliminates the cost of an additional part and the associated assembly operation. It should also be appreciated that each solenoid 88 is fixed to the housing 28 and electrically connected to the printed circuit board 18.

Figure 7:
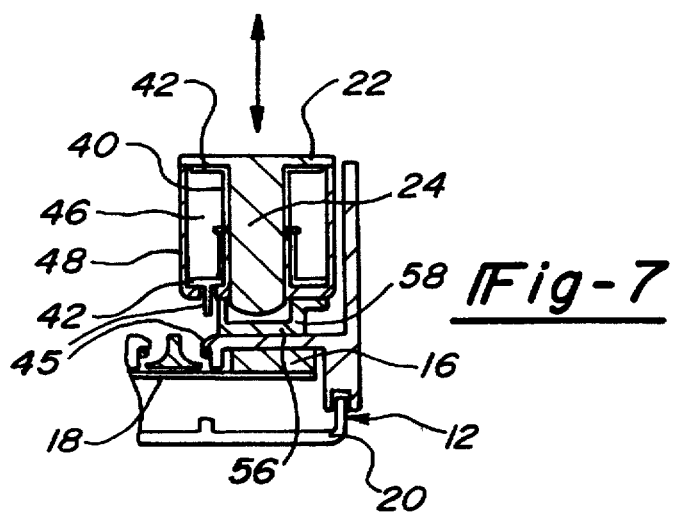
FIG. 7 is a partial fragmentary view of a portion of the solenoid assembly and electronic control unit and hydraulic control unit of FIG. 1 illustrating assembly and disassembly.

Referring to FIG. 7, the solenoid assembly 10 is assembled to the electronic control unit 12. When the electronic control unit 12 is fastened to the hydraulic control unit 14, the valve stem 24 is disposed in the passageway 43 through the bobbin 40 and the spring cap 58 is slightly compressed such as 0.8 millimeters and acts as a spring member to provide a spring force. The spring force provides intimate magnetic contact between the can 48 and the valve seat 22 in a range of 4 to 54 newtons and maintains magnetic contact during vehicle vibration and impact loading of the vehicle. It should be appreciated that this connection is important to the performance of the solenoid 38 and specifically to maintaining the magnetic flux path.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A solenoid assembly for an anti-lock braking system comprising:

a housing having a cavity;

a plurality of solenoids, each of said solenoids comprising a bobbin, a coil wrapped about said bobbin and a can for receiving said bobbin and being received within said cavity; and an overmold binding said bobbin, said coil and said can together and being disposed between said can and said housing for each of the solenoids to provide a resilient force for each of the solenoids.

2. A solenoid assembly as set forth in claim 1 wherein said overmold is made of a relatively low durometer material.

3. A solenoid assembly as set forth in claim 1 wherein said overmold is made of santoprene or silicone.

4. A solenoid assembly as set forth in claim 1 including at least one lead interconnecting each of said solenoids and a printed circuit board.

5. A solenoid assembly as set forth in claim 4 wherein said at least one lead is made of a bronze material.

6. A solenoid assembly as set forth in claim 1 wherein said housing includes at least one finger extending into said cavity to engage each of said solenoids.

7. A solenoid assembly as set forth in claim 1 wherein said housing has a base wall and a plurality of fingers extending from said base wall and into said cavity, at least two of said fingers engage each of said solenoids.

8. A solenoid assembly for an anti-lock braking system comprising:

a housing having a cavity;

a plurality of solenoids, each of said solenoids having a bobbin, coil and can and being received within said cavity; and an overmold binding said bobbin, said coil and said can together and being disposed between said can and said housing and each of the solenoids to provide a resilient force for each of the solenoids, said overmold extending between said can and said housing to act as a spring cap to hold said coil in position.

9. A solenoid assembly as set forth in claim 8 wherein said overmold is made of a relatively low durometer material.

10. A solenoid assembly as set forth in claim 9 wherein said overmold is made of santoprene or silicone.

11. A solenoid assembly as set forth in claim 8 including at least one lead interconnecting each of said solenoids and a printed circuit board.

12. A solenoid assembly as set forth in claim 11 wherein said at least one lead is made of a bronze material.

13. A solenoid assembly as set forth in claim 8 wherein said housing includes at least one finger extending into said cavity to engage each of said solenoids.

14. A solenoid assembly as set forth in claim 8 wherein said housing has a base wall and a plurality of fingers extending from said base wall and into said cavity, at least two of said fingers engage each of said solenoids.

15. A solenoid assembly for an anti-lock braking system comprising:

a housing having a cavity and at least one finger extending into said cavity;

a plurality of solenoids, each of said solenoids comprising a bobbin, a coil wrapped about said bobbin and a can for receiving said bobbin and said coil and being received within said cavity and engaging said at least one finger; and an overmold binding said bobbin, said coil and said can together and being disposed between said housing and each of the solenoids to provide a resilient force for each of the solenoids, said overmold extending through an aperture of said can between a bottom wall of said can and a base wall of said housing to act as spring cap to hold said coil in position.

16. A solenoid assembly as set forth in claim 15 wherein each of said solenoids includes a snap and said housing includes a barb extending through said snap.

17. A solenoid assembly as set forth in claim 15 including at least one bronze lead interconnecting each of said solenoids and printed circuit board.

* * * * *